(12) United States Patent
Osawa

(10) Patent No.: US 7,161,636 B2
(45) Date of Patent: Jan. 9, 2007

(54) VERTICAL SHARPNESS ADJUSTMENT DEVICE AND TV RECEIVER THEREWITH

(75) Inventor: Ikuo Osawa, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 521 days.

(21) Appl. No.: 10/675,632

(22) Filed: Sep. 30, 2003

(65) Prior Publication Data

US 2004/0085481 A1 May 6, 2004

(30) Foreign Application Priority Data

Nov. 6, 2002 (JP) ............................. 2002-322498

(51) Int. Cl.
*H04N 5/21* (2006.01)
*H04N 1/58* (2006.01)
*H04N 1/409* (2006.01)

(52) U.S. Cl. ...................... 348/628; 348/625; 348/665; 348/252; 382/266; 358/3.27; 358/532

(58) Field of Classification Search ................ 348/628, 348/625, 629, 627, 630, 665, 252; 382/266, 382/263, 274; 358/3.27, 532, 447
See application file for complete search history.

(56) References Cited

U.S. PATENT DOCUMENTS

| | | | | |
|---|---|---|---|---|
| 3,562,424 A | * | 2/1971 | Legler ........................ | 348/629 |
| 3,804,980 A | | 4/1974 | Lowry | |
| 3,995,108 A | * | 11/1976 | Morrison .................... | 348/627 |
| 4,245,238 A | * | 1/1981 | Fuhrer ........................ | 348/628 |
| 4,336,552 A | * | 6/1982 | Tanaka ........................ | 348/606 |
| 4,360,830 A | * | 11/1982 | Poetsch et al. ............. | 348/628 |
| 4,365,266 A | * | 12/1982 | Lagoni ........................ | 348/628 |
| 4,403,246 A | * | 9/1983 | Thornberry ................. | 348/628 |
| 4,612,567 A | * | 9/1986 | Pritchard .................... | 348/451 |
| 4,647,960 A | * | 3/1987 | Miura et al. ................. | 348/628 |
| 4,658,295 A | * | 4/1987 | Umezawa .................... | 348/625 |
| 4,802,010 A | * | 1/1989 | Skinner et al. ............. | 348/625 |
| 4,882,628 A | * | 11/1989 | Sugimori et al. ........... | 348/628 |
| 4,916,538 A | * | 4/1990 | Carver et al. ............... | 348/625 |
| 4,962,419 A | * | 10/1990 | Hibbard et al. ............. | 348/627 |
| 5,006,927 A | * | 4/1991 | Creed et al. ................. | 348/665 |
| 5,121,209 A | * | 6/1992 | Smith et al. ................. | 348/625 |
| 5,170,248 A | * | 12/1992 | Min .......................... | 348/628 |
| 5,268,758 A | * | 12/1993 | Nakayama et al. ......... | 348/628 |
| 5,268,759 A | * | 12/1993 | Kishimoto et al. ......... | 348/606 |
| 5,363,140 A | * | 11/1994 | Isomoto et al. ............. | 348/445 |
| 5,396,157 A | * | 3/1995 | Hackett et al. ............. | 315/394 |
| 5,428,398 A | * | 6/1995 | Faroudja ..................... | 348/452 |
| 5,430,499 A | * | 7/1995 | Asada et al. ................. | 348/628 |

(Continued)

FOREIGN PATENT DOCUMENTS

JP      10-93842      4/1998

*Primary Examiner*—David Ometz
*Assistant Examiner*—Jean W. Désir
(74) *Attorney, Agent, or Firm*—Fish & Richardson P.C.

(57) ABSTRACT

A vertical sharpness adjustment device with which a viewer of a TV receiver can choose a degree of vertical sharpness adjustment to enhance a contour of a picture in vertical direction is offered. The vertical sharpness adjustment device includes a terminal to which a vertical sharpness control signal given by the viewer is applied, a control circuit to which the vertical sharpness control signal from the terminal is applied and a vertical sharpness adjustment circuit which adjusts the degree of the vertical sharpness of a video signal according to the vertical sharpness control signal from the control circuit.

12 Claims, 5 Drawing Sheets

U.S. PATENT DOCUMENTS

| | | | |
|---|---|---|---|
| 5,446,503 A * | 8/1995 | Sproule | 348/628 |
| 5,467,145 A * | 11/1995 | Limberg | 348/628 |
| 5,521,636 A * | 5/1996 | Nakayama et al. | 348/222.1 |
| 5,561,473 A * | 10/1996 | Saionji et al. | 348/628 |
| 5,581,306 A * | 12/1996 | Ohara | 348/625 |
| 5,587,745 A * | 12/1996 | Griepentrog et al. | 348/626 |
| 5,940,141 A * | 8/1999 | Faroudja et al. | 348/628 |
| 6,034,742 A * | 3/2000 | Kimoto et al. | 348/625 |
| 6,330,038 B1 * | 12/2001 | Johnson | 348/625 |
| 6,377,313 B1 * | 4/2002 | Yang et al. | 348/630 |
| 6,392,714 B1 * | 5/2002 | Steinberg et al. | 348/666 |
| 6,424,383 B1 * | 7/2002 | Terai et al. | 348/628 |

\* cited by examiner

Fig.2
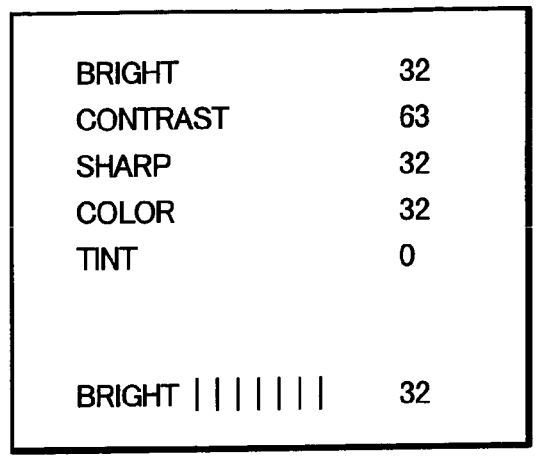
Fig.3A
Fig.3B
Fig.3C
Fig.3D Fig.4A  $b$  
Fig.4B  $\frac{a+c}{2}$  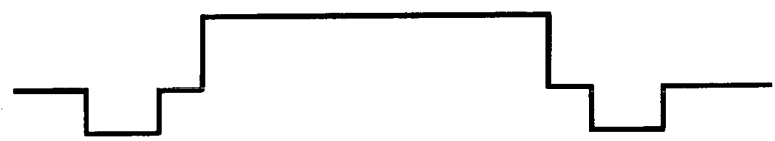
Fig.4C  $b-\left(\frac{a+c}{2}\right)$  
Fig.4D  $b+\left(b-\left(\frac{a+c}{2}\right)\right)$  

Fig.5A  $c$  
Fig.5B  $\frac{b+d}{2}$  
Fig.5C  $c-\left(\frac{b+d}{2}\right)$  
Fig.5D  $c+\left(c-\left(\frac{b+d}{2}\right)\right)$  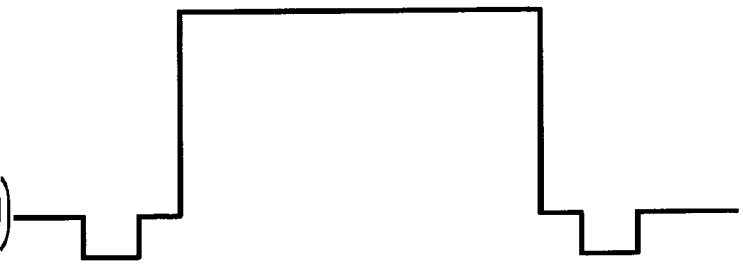

| | |
|---|---|
| BRIGHT | 32 |
| CONTRAST | 63 |
| SHARP | 32 |
| V-SHARP | 3 |
| COLOR | 32 |
| TINT | 0 |
| BRIGHT ||||||| | 32 |

VERTICAL SHARPNESS ADJUSTMENT DEVICE AND TV RECEIVER THEREWITH

BACKGROUND OF THE INVENTION

1. Field of the Invention

This invention relates to a vertical sharpness adjustment device which provides a video signal (brightness signal) with a sharpness adjustment in vertical direction on a TV (television) screen and a TV receiver equipped with it, specifically to a vertical sharpness adjustment device which provides a vertical sharpness adjustment best suitable for viewer's requirement and a TV receiver equipped with it.

2. Description of the Related Art

A sharpness adjustment has been known as one of functions a TV receiver is provided with. The sharpness adjustment is to enhance a contour of a picture in horizontal direction. When a contour of an object is enhanced, the object looks crisp. The object looks crispier to a viewer compared with a case in which the contour is not enhanced. In addition to the sharpness adjustment, the TV receiver is provided with following adjustment functions.

Brightness: an adjustment to brightness
Contrast: an adjustment to difference in brightness between black and white
Color: an adjustment to depth of a color
Tint: an adjustment to a hue In general, these parameters can be adjusted by a viewer to his/her requirements. The adjustments are made either with a knob on the TV receiver itself or with a remote controller referring to adjustment values displayed on the TV screen.

FIG. 2 shows an example of display of the adjustment values displayed on the TV screen with the remote controller. Five parameters, i.e. BRIGHTNESS, CONTRAST, SHARP, COLOR and TINT, are displayed from top to bottom in FIG. 2. The display means that the five parameters, i.e. BRIGHTNESS, CONTRAST, SHARP, COLOR and TINT, are adjustable to the viewer's requirements with the TV receiver.

It also means that BRIGHTNESS is currently under adjustment and a degree of BRIGHTNESS is 32. The viewer can set the degree of BRIGHTNESS to an arbitrary value within a range of 0–63, for example. In this way, the viewer can choose best suitable values accordingly to his/her likings and/or reception conditions (intensity of airwaves and so on), regarding the five parameters mentioned above.

The sharpness adjustment function of a TV receiver is described in a following patent document.

Kokai No. 10-93842.

However, the viewer has not been able to adjust a vertical sharpness which enhances a contour of a picture in vertical direction with a conventional TV receiver. The vertical sharpness adjustment is to enhance the contour in vertical direction when the brightness of a video signal changes from black to white or from white to black, over a period of around 1H (one horizontal period). In this case also, an object looks crispier compared with a case in which the contour is not enhanced.

The vertical sharpness adjustment has a positive effect to make the object look crispier on the one hand, but also has a negative effect to increase noise on the screen on the other hand. For this reason, performing the vertical sharpness adjustment in a weak airwave area or the like would result in severe noise on the screen, giving the opposite effect to what was intended.

SUMMARY OF THE INVENTION

This invention is directed to solve the problem addressed above and offers a vertical sharpness adjustment device having a terminal to which a vertical sharpness control signal given by a viewer is applied, a control circuit to which the vertical sharpness control signal from the terminal is applied and a vertical sharpness adjustment circuit which adjusts a degree of the vertical sharpness of a video signal according to the vertical sharpness control signal from the control circuit.

BRIEF DESCRIPTION OF THE DRAWING

FIG. 2 shows a display on a TV screen controlled with a remote controller according to a conventional art.

FIGS. 3A–3D show waveform charts used to describe operations of the vertical sharpness adjustment circuit according to the embodiment of this invention.

FIGS. 4A–4D show waveform charts used to describe operations of the vertical sharpness adjustment circuit according to the embodiment of this invention.

FIGS. 5A–5D show waveform charts used to describe operations of the vertical sharpness adjustment circuit according to the embodiment of this invention.

DETAILED DESCRIPTION OF THE INVENTION

Figure 1:
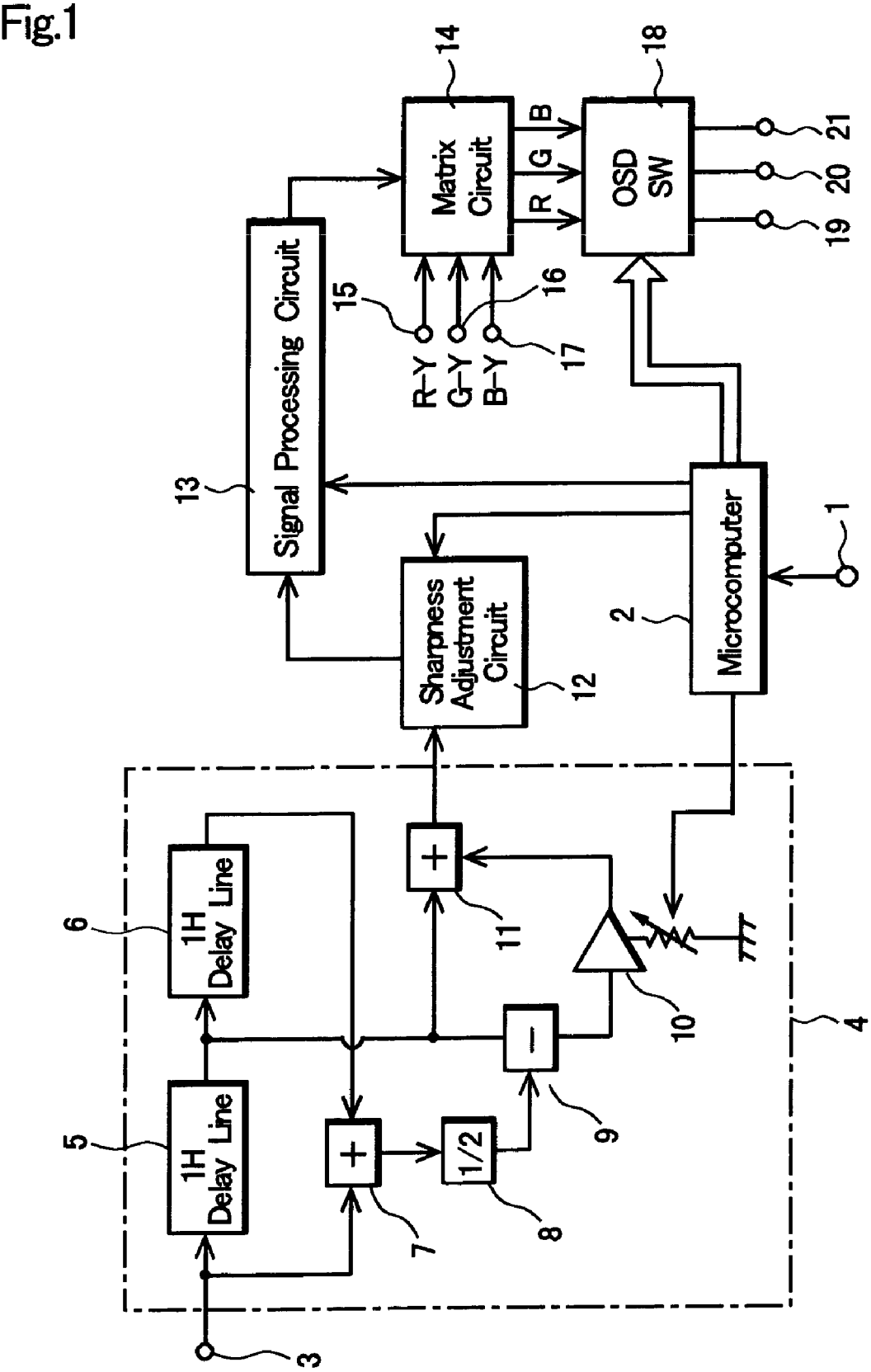
FIG. 1 is a block diagram showing a vertical sharpness adjustment device according to an embodiment of this invention.

Next, an embodiment of this invention will be described referring to FIG. 1. FIG. 1 is a block diagram showing a vertical sharpness adjustment device according to the embodiment of this invention. A vertical sharpness control signal given by a viewer of a TV receiver is applied to a terminal 1. The vertical sharpness control signal from the terminal 1 is applied to a microcomputer 2 which works as a control circuit. A video signal is applied to a video input terminal 3.

A vertical sharpness adjustment circuit 4 is composed of a first 1H delay line 5 to delay the video signal by a period of 1H (one horizontal period), a second 1H delay line 6 to which an output signal of the first delay line 5 is applied, a first adder 7 which adds the video signal and an output signal of the second 1H delay line 6, an attenuator 8 to halve a level of an output signal of the first adder 7, a subtracter 9 to subtract an output signal of the attenuator 8 from the output of the first 1H delay line 5, a level adjustment circuit 10 to adjust a level of an output signal of the subtracter 9 and a second adder 11 to add an output signal of the level adjustment circuit 10 and the output signal of the first 1H delay line 5.

A control signal given by the viewer of the TV receiver is provided through the microcomputer 2 to a sharpness adjustment circuit 12 which performs a horizontal sharpness adjustment on the video signal. A signal processing circuit 13 performs a brightness adjustment and a contrast adjustment on an output video signal of the sharpness adjustment circuit 12 according to control signals from the microcomputer 2.

A matrix circuit 14 generates each of primary color signals R, G and B by adding a video signal from the signal processing circuit 13 and each of R-Y signal, G-Y signal and B-Y signal from terminals 15, 16 and 17, respectively. An OSD (On Screen Display) switch 18 switches between the primary color signals R, G and B from the matrix circuit 14 and primary color signals R, G and B for a text signal from the microcomputer 2.

Each of the primary color signals R, G and B of a picture formed of the primary color signals from the matrix circuit 14, on which the text signal from the microcomputer 2 is superimposed, is obtained at each of the output terminals 19, 20 and 21, respectively.

Next, operation of the vertical sharpness adjustment device shown in FIG. 1 will be described. The vertical sharpness adjustment circuit 4 provides the video signal with a sharpness adjustment in vertical direction. A degree of the vertical sharpness adjustment can be modified by adjusting an output level of the level adjustment circuit 10 with the control signal from the microcomputer 2. The vertical sharpness control signal given by the viewer of the TV receiver is applied from the terminal 1 to the microcomputer 2.

Therefore the vertical sharpness adjustment can be controlled through the terminal 1. The vertical sharpness adjustment has a positive effect to make the object look crispier on the one hand, but has a negative effect to increase noise on the screen on the other hand. For this reason, performing the vertical sharpness adjustment in a weak airwave area or the like would result in severe noise on the screen, giving the opposite effect to what was intended.

Thus, the viewer can choose to provide slight adjustment or no adjustment on the vertical sharpness in the weak airwave area or the like. And the viewer can choose to provide more adjustment in a strong airwave area. By choosing a right amount of adjustment, the viewer can enjoy an effect of the best vertical sharpness adjustment.

Next, operation in the vertical sharpness adjustment circuit 4 will be described using the waveform charts shown in FIGS. 3A–3D. The video signal from the video input terminal 3 is applied to the second 1H delay line 6 after passing through the first 1H delay line 5. When the video signal at the video input terminal 3 is a video signal c shown in FIG. 3C, the output signal of the first 1H delay line 5 is a video signal b shown in FIG. 3B, and the output signal of the second 1H delay line 6 is a video signal a shown in FIG. 3A.

The video signals a and b are assumed to be 100% black input signals. The video signals c and d are assumed to be 100% white input signals. The video signals a, b, c and d are continuous video signals. There is a transition from black to white between the signal b and the signal c. Such a transition is one of signal changes to which the vertical sharpness adjustment should be applied. That is to say, blackness for the video signal b in FIG. 3B is to be enhanced. And whiteness for the video signal c is to be enhanced.

Operations to enhance blackness for the black video signal b in FIG. 3B will be explained referring to the waveform charts in FIGS. 4A–4D. FIG. 4A shows the video signal b. FIG. 4B shows an average of the video signal a and the video signal c. The video signal b in FIG. 4A is obtained from the first 1H delay line 5, and the signal shown in FIG. 4B is obtained from the attenuator 8. The first adder 7 adds the output signal a of the second 1H delay line 6 and the video signal c. The attenuator 8 reduces a result of the addition to half. Therefore, the signal shown in FIG. 4B is obtained from the attenuator 8. The signal shown in FIG. 4B is subtracted from the video signal b with the subtractor 9.

A signal enhanced to more black (toward lower level) as shown in FIG. 4C is obtained as an output signal of the subtractor 9. Then, a signal with an enhanced blackness as shown in FIG. 4D is generated by adding the signal enhanced to more black (toward lower level) as shown in FIG. 4C and the video signal b with the second adder 11. Note that the signal after the enhancement is negative because the video signal b is a complete black signal in this case.

Strength of the blackness-enhanced signal shown in FIG. 4C can be changed by adjusting a level of the output signal of the subtractor 9 with the level adjustment circuit 10, thus the degree of vertical sharpness adjustment can be modified.

As described above, the video signal b shown in FIG. 4A is converted to the signal shown in FIG. 4D, and the blackness is enhanced.

Next, operations to enhance whiteness for the white video signal c shown in FIG. 3C will be explained referring to FIGS. 5A–5D. When the video signal at the video input terminal 3 is a video signal d shown in FIG. 3D, the output signal of the first 1H delay line 5 is the video signal c shown in FIG. 3C, and the output signal of the second 1H delay line 6 is the video signal b shown in FIG. 3B. FIG. 5A shows the video signal c. FIG. 5B shows an average of the video signal b and the video signal d. Similar operations take place in the whiteness enhancement as in the blackness enhancement. The signal shown in FIG. 5B is obtained from the attenuator 8. The signal shown in FIG. 5B is subtracted from the video signal c with the subtractor 9. A signal enhanced to more white (toward higher level) as shown in FIG. 5C is obtained as an output signal of the subtractor 9.

Then, a signal with an enhanced whiteness as shown in FIG. 5D is generated by adding the signal enhanced to more white as shown in FIG. 5C and the video signal c with the second adder 11. Strength of the whiteness-enhanced signal shown in FIG. 5C can be changed by adjusting a level of the output signal of the subtractor 9 with the level adjustment circuit 10, thus the degree of vertical sharpness adjustment can be modified.

As described above, the video signal c as shown in FIG. 5A is converted to the signal shown in FIG. 5D, and the whiteness is enhanced.

As described above, the transition from the video signal b shown in FIG. 3B to the video signal c shown in FIG. 3C is replaced with the transition from the signal shown in FIG. 4D to the signal shown in FIG. 5D, due to the work of the vertical sharpness adjustment circuit 4.

An output video signal from the vertical sharpness adjustment circuit 4 is applied to the sharpness circuit 12 which performs the horizontal sharpness adjustment, and then applied to the signal processing circuit 13 which performs the brightness adjustment and the contrast adjustment. Information on the amount of adjustment tailored to the viewer's liking is provided from the microcomputer 2 to the sharpness adjustment circuit 12 and the signal processing circuit 13.

A video signal adjusted to the viewer's liking is fed to the matrix circuit 14 as a Y signal accordingly. The matrix circuit 14 generates each of the primary color signals R, G and B by adding the Y signal and each of the R-Y signal, the G-Y signal and the B-Y signal from each of the terminals 15, 16 and 17, respectively, and provides the OSD switch 18 with the primary color signals.

Figures 6, 7:
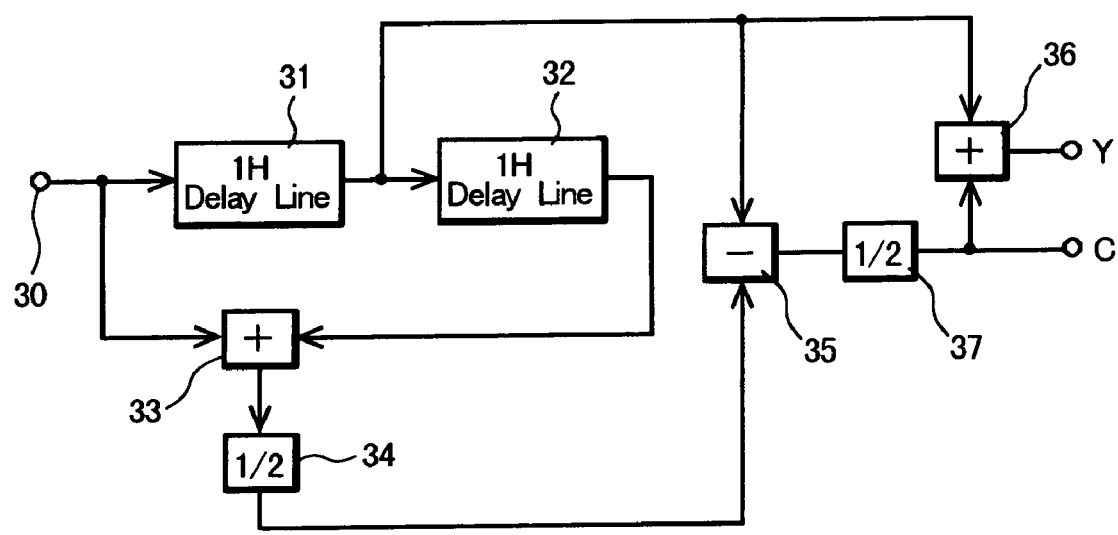
FIG. 6 shows a display on a TV screen controlled with a remote controller according to the embodiment of this invention.
FIG. 7 is a block diagram used to describe operations of a comb filter used in a TV receiver.

The OSD switch 18 switches between the primary color signals R, G and B from the matrix circuit 14 and the primary color signals R, G and B for the text signal from the microcomputer 2. The microcomputer 2 generates text information to display contents as shown in FIG. 6 on the TV screen. The microcomputer 2 includes a character generator. A degree of the control signal for the level adjustment circuit 10 is displayed as V-SHARP of a value of 3 on the fourth line on the screen, as shown in FIG. 6. To change the value of 3, the viewer only needs to modify the control signal for the vertical sharpness adjustment applied to the terminal 1. Then the microcomputer 2 modifies the degree of the control signal for the level adjustment circuit 10 and generates the text information to display a modified value of V-SHARP at the same time.

Each of the primary color signals R, G and B of the picture with adjusted vertical sharpness, on which the text signal from the microcomputer 2 is superimposed, is obtained at each of the output terminals 19, 20 and 21, respectively.

FIG. 7 shows a comb filter which separates a composite video signal into a brightness (Y) signal and a chroma (C) signal. The composite video signal is applied to an input terminal 30.

Each of a 1H delay line 31 and a 1H delay line 32 delays the composite video signal by a period of 1H. Each of an adder 33, an attenuator 34 and a subtracter 35 makes similar operation as each of the adder 7, the attenuator 8 and the subtracter 9 in FIG. 1, respectively. Phase of the chroma signal is inverted once every 1H, while phase of the brightness signal is not inverted. Therefore, after subtraction with the subtractor 35, the brightness signal is eliminated by compensation, while the chroma signal remains.

When the chroma signal from the subtracter 35 is halved with an attenuator 37 and added to the composite video signal with the adder 36, the chroma signal is eliminated by compensation and only the brightness signal is obtained this time. The comb filter shown in FIG. 7 has a structure and makes operation similar to the vertical sharpness adjustment circuit 4 shown in FIG. 1. With this being the case, each of the 1H delay line 31, the 1H delay line 32, the adder 33, the attenuator 34 and the subtracter 35 is used also as each counterpart in FIG. 1 in this embodiment. By doing so, expensive 1H delay lines can be saved and number of elements can be reduced.

The vertical sharpness adjustment on the video signal is made possible with the vertical sharpness adjustment device of this invention. The degree of the vertical sharpness adjustment can be adjusted to the viewer's liking so that the viewer can be benefited from the effect of the best vertical sharpness adjustment.

Also the viewer can adjust the degree of the vertical sharpness adjustment watching the value indicating the degree of the vertical sharpness adjustment on the TV screen, according to the vertical sharpness adjustment device of this invention. Furthermore, the 1H delay lines and other circuit blocks in the vertical sharpness adjustment device can be shared with the comb filter to separate the composite video signal into the brightness (Y) signal and the chroma (C) signal.

What is claimed is:

1. A vertical sharpness adjustment device comprising:
    a terminal to which a vertical sharpness adjustment control signal is applied by a viewer of a TV receiver;
    a control circuit to which the vertical sharpness adjustment control signal is applied from the terminal, wherein the control circuit generates a signal to display the degree of vertical sharpness adjustment on a screen of the TV receiver; and
    a vertical sharpness adjustment circuit which adjusts a degree of vertical sharpness adjustment on a video signal according to the vertical sharpness adjustment control signal from the control circuit, wherein the vertical sharpness adjustment circuit comprises:
        a video input terminal to which the video signal is applied;
        a first 1H delay line to delay the video signal by one horizontal period; and
        a second 1H delay line to delay an output of the first delay line by one horizontal period,
    and wherein the vertical sharpness adjustment circuit adjusts the degree of vertical sharpness adjustment by adjusting a level of a signal resulting from operations performed on the video signal at the video input terminal, a video signal from the first 1H delay line and a video signal from the second 1H delay line.

2. The vertical sharpness adjustment device of claim 1, wherein the control circuit comprises a microcomputer.

3. The vertical sharpness adjustment device of claim 1, wherein the first 1H delay line and the second 1H delay line are also used as delay lines for a comb filter to separate a composite video signal into a brightness signal and a chroma signal.

4. The vertical sharpness adjustment device of claim 1 wherein the vertical sharpness adjustment circuit further comprises:
    a first adder to add the video signal and an output signal of the second 1H delay line;
    a subtractor to subtract an output signal of the first adder from the output signal of the first 1H delay line;
    a level adjustment circuit to adjust a level of an output signal of the subtractor; and
    a second adder to add an output signal of the level adjustment circuit and the output signal of the first 1H delay line.

5. A vertical sharpness adjustment device comprising:
    a terminal to which a vertical sharpness adjustment control signal is applied by a viewer of a TV receiver;
    a control circuit to which the vertical sharpness adjustment control signal is applied from the terminal; and
    a vertical sharpness adjustment circuit which adjusts a degree of vertical sharpness adjustment on a video signal according to the vertical sharpness adjustment control signal from the control circuit, wherein the vertical sharpness adjustment circuit comprises:
        a video input terminal to which the video signal is applied;
        a first 1H delay line to delay the video signal by one horizontal period;
        a second 1H delay line to delay an output signal of the first 1H delay line by one horizontal period;
        a first adder to add the video signal and an output signal of the second 1H delay line; a subtractor to subtract an output signal of the first adder from the output signal of the first 1H delay line;
        a level adjustment circuit to adjust a level of an output signal of the subtractor; and
        a second adder to add an output signal of the level adjustment circuit and the output signal of the first 1H delay line.

6. A vertical sharpness adjustment device comprising:
    a terminal to which a vertical sharpness adjustment control signal is applied by a viewer of a TV receiver;
    a control circuit to which the vertical sharpness adjustment control signal is applied from the terminal; and a vertical sharpness adjustment circuit which adjusts a degree of vertical sharpness adjustment on a video signal according to the vertical sharpness adjustment control signal from the control circuit, wherein the vertical sharpness adjustment circuit comprises:
  a video input terminal to which the video signal is applied;
  a first 1H delay line to delay the video signal by one horizontal period;
  a second 1H delay line to delay an output signal of the first 1H delay line by one horizontal period;
  a first adder to add the video signal and an output signal of the second 1H delay line; an attenuator to halve a level of an output signal of the first adder;
  a subtractor to subtract an output signal of the attenuator from the output signal of the first 1H delay line;
  a level adjustment circuit to adjust a level of an output signal of the subtractor; and
  a second adder to add an output signal of the level adjustment circuit and the output signal of the first 1H delay line.

7. A TV receiver comprising a vertical sharpness adjustment device which comprises:
  a terminal to which a vertical sharpness adjustment control signal is applied by a viewer of a TV receiver;
  a control circuit to which the vertical sharpness adjustment control signal is applied from the terminal, wherein the control circuit generates a signal to display the degree of vertical sharpness adjustment on a screen of the TV receiver; and
  a vertical sharpness adjustment circuit which adjusts a degree of vertical sharpness adjustment on a video signal according to the vertical sharpness adjustment control signal from the control circuit, wherein the vertical sharpness adjustment circuit comprises:
    a video input terminal to which the video signal is applied;
    a first 1H delay line to delay the video signal by one horizontal period; and
    a second 1H delay line to delay an output of the first delay line by one horizontal period,
  and wherein the vertical sharpness adjustment circuit adjusts the degree of vertical sharpness adjustment by adjusting a level of a signal resulting from operations performed on the video signal at the video input terminal, a video signal from the first 1H delay line and a video signal from the second 1H delay line.

8. The TV receiver of claim 7, wherein the control circuit comprises a microcomputer.

9. The TV receiver of claim 7, wherein the first 1H delay line and the second 1H delay line are also used as delay lines for a comb filter to separate a composite video signal into a brightness signal and a chroma signal.

10. The TV receiver of claim 7 wherein the vertical sharpness adjustment circuit comprises:
  a first adder to add the video signal and an output signal of the second 1H delay line;
  a subtractor to subtract an output signal of the first adder from the output signal of the first 1H delay line;
  a level adjustment circuit to adjust a level of an output signal of the subtractor; and
  a second adder to add an output signal of the level adjustment circuit and the output signal of the first 1H delay line.

11. A TV receiver comprising a vertical sharpness adjustment device which comprises:
  a terminal to which a vertical sharpness adjustment control signal is applied by a viewer of a TV receiver;
  a control circuit to which the vertical sharpness adjustment control signal is applied from the terminal; and
  a vertical sharpness adjustment circuit which adjusts a degree of vertical sharpness adjustment on a video signal according to the vertical sharpness adjustment control signal from the control circuit, wherein the vertical sharpness adjustment circuit comprises:
    a video input terminal to which the video signal is applied;
    a first 1H delay line to delay the video signal by one horizontal period;
    a second 1H delay line to delay an output signal of the first 1H delay line by one horizontal period;
    a first adder to add the video signal and an output signal of the second 1H delay line;
    a subtractor to subtract an output signal of the first adder from the output signal of the first 1H delay line;
    a level adjustment circuit to adjust a level of an output signal of the subtractor; and
    a second adder to add an output signal of the level adjustment circuit and the output signal of the first 1H delay line.

12. A TV receiver comprising a vertical sharpness adjustment device which comprises:
  a terminal to which a vertical sharpness adjustment control signal is applied by a viewer of a TV receiver;
  a control circuit to which the vertical sharpness adjustment control signal is applied from the terminal; and
  a vertical sharpness adjustment circuit which adjusts a degree of vertical sharpness adjustment on a video signal according to the vertical sharpness adjustment control signal from the control circuit, wherein the vertical sharpness adjustment circuit comprises:
    a video input terminal to which the video signal is applied;
    a first 1H delay line to delay the video signal by one horizontal period;
    a second 1H delay line to delay an output signal of the first 1H delay line by one horizontal period;
    a first adder to add the video signal and an output signal of the second 1H delay line; an attenuator to halve a level of an output signal of the first adder;
    a subtractor to subtract an output signal of the attenuator from the output signal of the first 1H delay line;
    a level adjustment circuit to adjust a level of an output signal of the subtractor; and
    a second adder to add an output signal of the level adjustment circuit and the output signal of the first 1H delay line.

* * * * *